US011900251B2

(12) United States Patent
Cohen et al.

(10) Patent No.: US 11,900,251 B2
(45) Date of Patent: Feb. 13, 2024

(54) AMPLIFICATION OF INITIAL TRAINING DATA

(71) Applicant: CA, Inc., San Jose, CA (US)

(72) Inventors: Michael J. Cohen, Flushing, NY (US); Daniel David Sill, Medford, NY (US)

(73) Assignee: CA, INC., San Jose, CA (US)

( * ) Notice: Subject to any disclaimer, the term of this patent is extended or adjusted under 35 U.S.C. 154(b) by 73 days.

(21) Appl. No.: 17/840,291

(22) Filed: Jun. 14, 2022

(65) Prior Publication Data

US 2022/0309290 A1  Sep. 29, 2022

Related U.S. Application Data

(62) Division of application No. 16/126,911, filed on Sep. 10, 2018, now Pat. No. 11,392,794.

(51) Int. Cl.
*G06K 9/62* (2022.01)
*G06N 3/08* (2023.01)
*G06N 20/00* (2019.01)
*G06F 18/214* (2023.01)
*G06V 10/82* (2022.01)

(52) U.S. Cl.
CPC .......... *G06N 3/08* (2013.01); *G06F 18/2148* (2023.01); *G06N 20/00* (2019.01); *G06V 10/82* (2022.01)

(58) Field of Classification Search
CPC .......... G06N 3/08; G06N 20/00; G06N 3/044; G06F 18/2148; G06F 18/24143; G06V 10/82
See application file for complete search history.

(56) References Cited

U.S. PATENT DOCUMENTS

| | | | |
|---|---|---|---|
| 8,438,026 B2 | 5/2013 | Fischer et al. | |
| 8,458,520 B2 | 6/2013 | Lee et al. | |
| 9,349,105 B2 | 5/2016 | Beymer et al. | |
| 9,785,719 B2 | 10/2017 | Ma et al. | |
| 11,392,794 B2 | 7/2022 | Cohen et al. | |
| 2012/0330880 A1 | 12/2012 | Arasu et al. | |
| 2016/0019271 A1* | 1/2016 | Ma | G06F 16/955 707/756 |
| 2016/0162456 A1* | 6/2016 | Munro | G06F 16/24532 704/9 |
| 2018/0018322 A1* | 1/2018 | Mukherjee | G06F 8/30 |
| 2020/0211077 A1* | 7/2020 | He | G06F 40/20 |
| 2020/0327225 A1* | 10/2020 | Nguyen | G06N 3/044 |
| 2021/0390455 A1* | 12/2021 | Schierz | G06N 5/04 |

* cited by examiner

*Primary Examiner* — Howard D Brown, Jr.
(74) *Attorney, Agent, or Firm* — Quarles & Brady LLP

(57) ABSTRACT

Techniques are disclosed relating to increasing the amount of training data available to machine learning algorithms. A computer system may access an initial set of training data that specifies a plurality of sequences, each of which may define a set of data values. The computer system may amplify the initial set of training data to create a revised set of training data. The amplifying may include identifying sub-sequences of data values in ones of the plurality of sequences in the initial set of training data and using an inheritance algorithm to create a set of additional sequences of data values, where each one of the set of additional sequences may include sub-sequences of data values from at least two different sequences in the initial set of training data. The computer system may process the set of additional sequences using the machine learning algorithm to train a machine learning model.

20 Claims, 9 Drawing Sheets

AMPLIFICATION OF INITIAL TRAINING DATA

CROSS REFERENCE TO RELATED APPLICATION

This application is a divisional of U.S. patent application Ser. No. 16/126,911, filed Sep. 10, 2018 by Michael J. Cohen et al. and titled, "AMPLIFICATION OF INITIAL TRAINING DATA", which is hereby incorporated by reference in its entirety for all purposes.

BACKGROUND

Technical Field

This disclosure relates generally to increasing the amount of training data available for use by artificial intelligence (AI)-based algorithms.

Description of the Related Art

Broadly speaking, the field of artificial intelligence is concerned with the development of systems that exhibit human intelligence (e.g., they can perform functions in a manner similar to humans). One common approach to AI is the use of machine learning (ML)—a subdivision of AI. In the machine learning context, ML-based algorithms are designed to produce a model based on known training data and use that model to make inferences on unknown data. As an example, a ML-based algorithm may train a model to classify people into two different groups based on their characteristics so that when the model is presented with data about a particular person, it can classify that person into one of those groups. Another approach to AI is the use of deep learning (DL), which may be classified as a subdivision of ML. In deep learning, DL-based algorithms build neural networks (that mimic the interconnections between the neurons in the human brain) and then use those neural networks to make inferences.

These AI-based algorithms (e.g., ML and DL-based algorithms), however, usually need a large amount of training data before they can produce reasonably accurate predictions. As such, the effective training of a model to recognize sequences of data values (such as time-series computer metrics or device data) for the purpose of identifying trends of interest is often hampered by the lack of sufficient realistic labeled training data due to the difficulty of simulating all possible trends in such a way that a sufficient range and variety of data values that could potentially indicate a particular trend are adequately represented in the labeled training data. Therefore, use of such a limited corpus of labeled training data can result in a model that will fail to recognize the desired trends when executed in production against real data.

SUMMARY

The present disclosure describes embodiments in which a system generates additional training data based on an initial set of training data. The additional training data may be used to supplement the training of a machine learning model, for example. In some embodiments, a computer system accesses an initial set of training data that specifies a plurality of sequences, each of which may define a set of data values. In some embodiments, the computer system amplifies the initial set of training data to create a revised set of training data. Amplifying the initial set of training data may include identifying sub-sequences of data values in ones of the plurality of sequences in the initial set of training data and then using an inheritance algorithm to create a set of additional sequences of data values where, according to the inheritance algorithm, each of the additional sequences of data values includes sub-sequences of data values from at least two different sequences in the initial set of training data. In some embodiments, the computer system processes the set of additional sequences in the revised set of training data using a machine learning algorithm to train a machine learning model.

Figure 1:
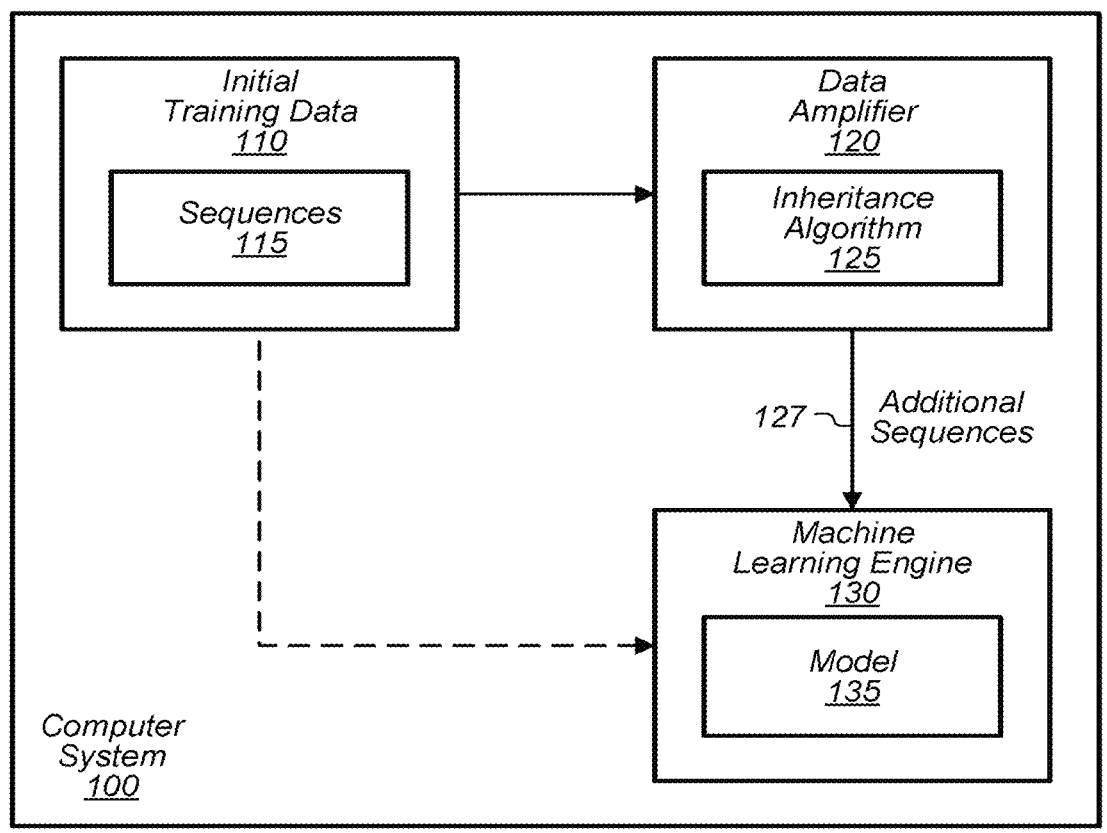
FIG. 1 is a block diagram illustrating example elements of a computer system capable of producing additional sequences using initial training data, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended ng to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, for training data that has multiple sequences, the terms "first" sequence and "second" sequence can be used to refer to any sequence of the training data. In other words, the first and second sequences are not limited to the initial two sequences of a training data.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes various techniques for using an initial set of available data to generate additional data that may be used, e.g., in a machine learning environment. For example, an initial set of training data that specifies sequences with data values (which may be referred to as "data value sequences") may be used to generate additional data value sequences, which may be fed into a machine learning algorithm to train a model. In various embodiments described below, a computer system generates one or more additional data value sequences by concatenating data values from different sections of different sequences within an initial set of training data. More specifically, in some embodiments, a computer system identifies sections or sub-sequences of data values for data value sequences within the initial set of training data. In some embodiments, the computer system subsequently generates an additional data value sequence by concatenating data values from at least one identified sub-sequence of one data value sequence and one identified sub-sequence of another data value sequence in the initial training data. For example, the computer system may concatenate the first half of one data value sequence with the second half of another data value sequence to create the additional data value sequence. In some embodiments, the generation of additional data value sequences may be performed in a manner that avoids the generation of less desirable data value sequences.

The present disclosure sets out to solve at least one technical problem pertaining to the lack of useful data that is available for training a model to produce more accurate predictions than would otherwise be possible without that data. As highlighted in the background, a limited corpus of training data can result in a model that will fail to recognize the desired trends when used in production against real data.

Some approaches have been proposed for generating additional training data for use in training machine learning models. In one prior approach, additional training data that includes sequences having data values is generated by randomly generating the data values within those sequences. This approach, however, suffers from the lack of representation of value transitions that are known to occur or be possible within a sequence. Said differently, randomly generating sequences creates nonsensical sequences, which is not desirable. In another approach, domain knowledge of the appropriate field is used to specifically craft sequences that follow known templates. This approach, however, requires extensive domain knowledge of the relevant field that is often not readily available. These approaches are thus deficient in solving the technical problem without sufficient downsides.

The techniques discussed in the present disclosure, however, may be advantageous over prior approaches as these techniques allow for additional training data to be generated that may better represent the theoretically possible data values sequences that can occur over time in, e.g., a production system, without requiring extensive domain knowledge of the relevant field to produce that additional training data. That is, while the additional training data may not have actually occurred or appeared in the initial training data, the additional training data has a reasonable probability of being accurate as such data has been generated from sections of sequences that have actually occurred—the additional training data thus represents potential data that may be encountered in the future by a machine learning algorithm. Accordingly, a revised set having the initial training data and the additional training data may allow for a machine learning algorithm to train a model that can be used to produce more accurate results than what would occur had the machine learning algorithm had only the initial training data available for training the model. Thus, the present disclosure describes techniques that provide a technical solution to the technical problem discussed above and further improve an area of technology (e.g., artificial intelligence). A system for implementing such techniques will now be discussed below, starting with FIG. 1.

Turning now to FIG. 1, a block diagram of a computer system 100 is shown. In various embodiments, computer system 100 is a set of components that are implemented via hardware or a combination of hardware and software routines. In the illustrated embodiment, computer system 100 includes initial training data 110, data amplifier 120, and machine learning engine 130. As further depicted, initial training data 110 includes sequences 115, data amplifier 120 includes inheritance algorithm 125, and machine learning engine 130 includes model 135. In some embodiments, computer system 100 may be implemented differently than shown—e.g., computer system 100 may access initial training data 110 from a location external to computer system 100.

Initial training data 110, in various embodiments, defines a set of sequences 115, which include data values, usable to train model 135. A sequence 115 may specify, for example, the respiration rate of an individual over a period of time, where each measurement is a data value in that sequence. While initial training data 110 can be time-series data, in some cases, initial training data 110 may be non-time-series data. As an example, initial training data 110 may be a series of commands or access requests submitted to a system, where each series may represent normal or abnormal behavior. Initial training data 110 may be obtained from any number of sources, which may include, for example, a sensor device that measures respiration rates or a user system that provides time-series computer metrics. In some embodiments, sequences 115 of initial training data 110 may identify (or correspond to) a particular trend. As an example, sequences 115 may identify a generally ascending trend of respiration rate per minute. In various embodiments, initial training data 110 is accessed by data amplifier 120 to produce additional sequences 127.

Data amplifier 120, in various embodiments, creates additional sequences 127 that are usable to supplement (or amplify) initial training data 110, producing a revised set of training data for machine learning engine 130. In various embodiments, data amplifier 120 implements an inheritance algorithm 125, which generates additional sequences 127 that inherit data values from sequences 115. In this manner, an additional sequence 127 that includes data values from multiple sequences 115 may be said to be a child sequence that inherits or receives DNA from a set of parent sequences (i.e., sequences 115). Before (or as part of) implementing inheritance algorithm 125, in various embodiments, data amplifier 120 determines a division of sequences 115 into sub-sequences (or sections). For example, data amplifier 120 may logically divide sequences 115 in half such that, for each sequence, there are two sub-sequences. After sequences 115 have been logically divided into sub-sequences, in various embodiments, inheritance algorithm 125 concatenates sub-sequences from different sequences 115 to form an additional sequence 127. Continuing with the above example, inheritance algorithm 125 may concatenate the first half of one sequence with the latter (or second) half of another sequence. After generating additional sequences 127, data amplifier 120 may send those sequences to machine learning engine 130.

Machine learning engine 130, in various embodiments, implements any assortment of machine learning algorithms to train a model 135 using initial training data 110 and additional sequences 127. Examples of machine learning algorithms may include clustering algorithms such as k-means and expectation maximization, Bayesian algorithms such as naive Bayes and Bayesian networks, recurrent neural networks such as long short-term memory (LSTM) neural networks, and regression algorithms such as linear regression. In some embodiments, machine learning engine 130 receives initial training data 110 and additional sequences 127 at separate points and thus processes them separately—e.g., trains model 135 using initial training data 110 and then when it receives additional sequences 127, it further trains model 135 using those additional sequences. In other embodiments, machine learning engine 130 may receive initial training data 110 and additional sequences 127 together as a revised set.

In one example implementation of system 100, system 100 receives initial training data 110 that specifies a limited set of sequences 115 relating to the respiration rates of individuals over a period of an hour. In order to increase the available training data, system 100 may pass initial training data 110 to data amplifier 120, which may implement inheritance algorithm 125 to generate additional sequences 127. In this example implementation, data amplifier 120 may determine a division of the set of sequences 115 such that each sequence is logically divided into two halves. Data amplifier 120 may select combinations of two sequences 115 from initial training data 110 and then may create two additional sequences 127 by combining, for the first additional sequence 127, the first half of the first selected sequence 115 with the latter half of the second selected sequence 115 and, for the second additional sequence 127, the latter half of the first sequence 115 with the first half of the second sequence 115. In various cases, data amplifier 120 may do this for each unique combination of two sequences 115 in initial training data 110. Thereafter, data amplifier 120 may provide additional sequences 127 to engine 130 to train model 135.

Implementing system 100 in this manner may be advantageous over prior approaches as it allows for additional training data to be generated that can be used to supplement a limited set of initial training data and thus allow for a machine learning model to be better trained. For example, the effectiveness of a recurrent neural network (RNN) is based on how limited the training data is in relation to the variety of data that will eventually be encountered during the actual execution of that RNN. Accordingly, by being able to generate additional training data that mimics known training data, the effectiveness of an RNN may be increased-resulting in more accurate predictions and thus improved operations of those systems that depend on such predictions.

As a non-limiting example to further highlight the advantages of the present disclosure, a model may be trained to understand that people usually precede a UNIX "rm" command with one of several actions that might create or edit a file (such as "vi", "cat >>", "ed", and "cp") followed by an "ls" as if to confirm something about the file to be deleted. When training that model, however, there are a vast number of combinations of valid commands, many of which may not be helpful in training the model. In order to prevent the model from raising too many false alarms as a result of being trained, e.g., using random command sequences, the techniques of the present disclosure may use an initial set of real sampled data of command sequences to generate additional command sequences that might actually be entered by a real person. These additional command sequences can then be used instead of the random command sequences to train a model to better report an anomaly, for example, when a person logs in and immediately starts deleting files. An example of amplifying initial training data 110 will now be discussed below to provide a deeper understanding of the techniques presented herein.

Figure 2A:
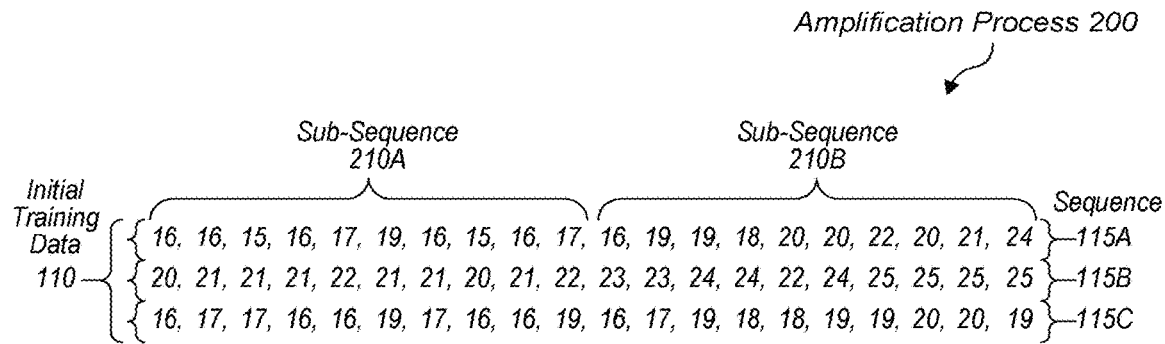
FIGS. 2A-C are block diagrams illustrating example elements of an amplification process for amplifying the initial training data, according to some embodiments.
Figure 2B:
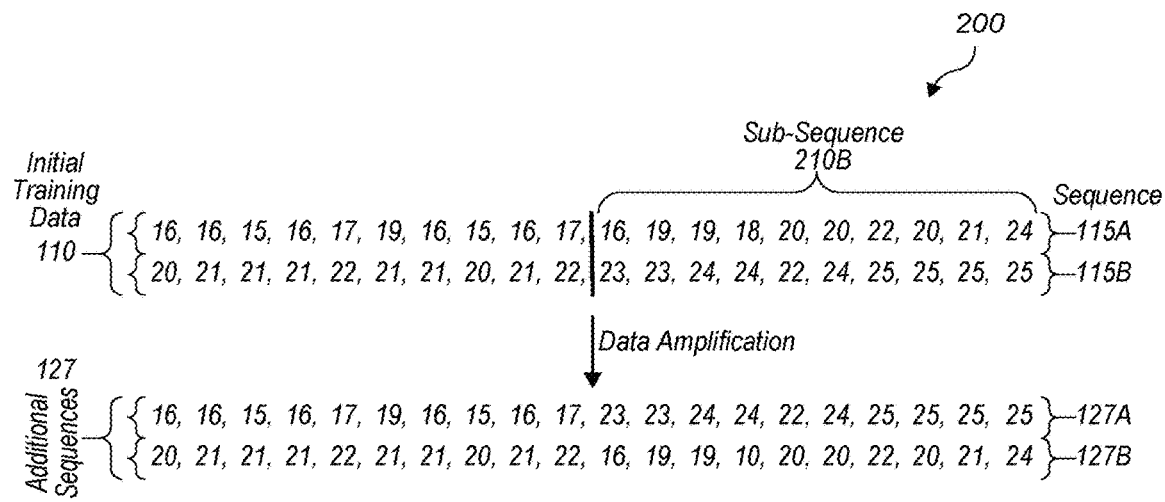
Figure 2C:
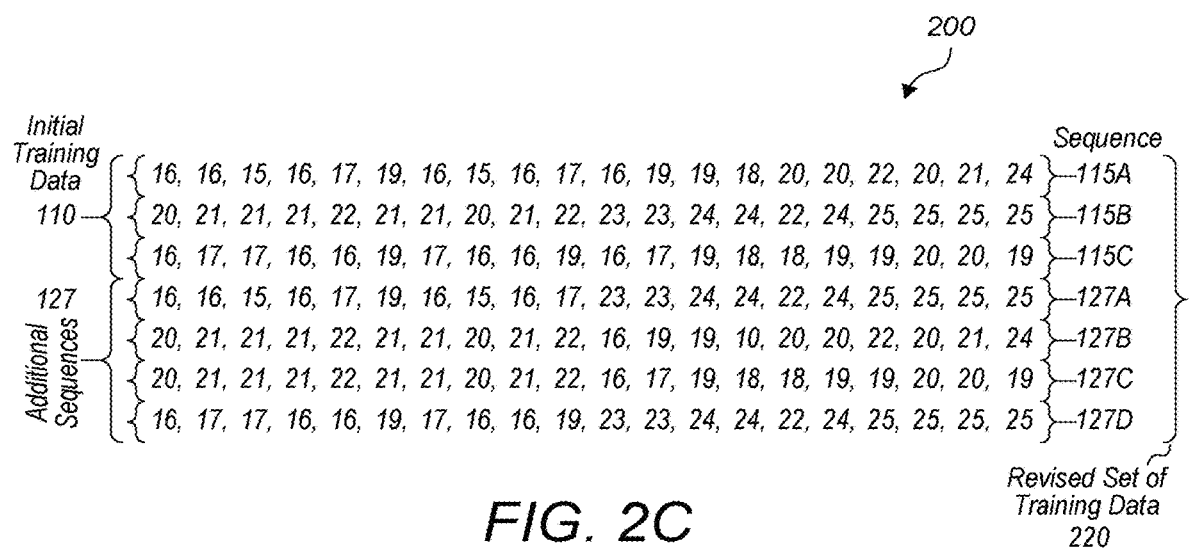

Turning now to FIG. 2A-C, block diagrams of an amplification process 200 to amplify initial training data 110 are shown. As shown within FIG. 2A, initial training data 110 includes sequences 115A, 115B, and 115C, all of equal length. While these sequences 115 are depicted as having the same length (i.e., the same number of data values), in some cases, they may have different lengths. For illustrative purposes, the depicted sequences 115 include data values that correspond to a generally ascending trend of respiration rate per minute. While not shown, in various embodiments, a label can be applied to sequences 115 to assist machine learning engine 130 in training model 135. In various instances, the label that is applied to sequences 115 may also be applied to additional sequences 127.

As discussed earlier, when amplifying initial training data 110 to produce a revised set that includes additional sequences 127, data amplifier 120 may determine a logical division of sequences 115 into sub-sequences 210. As shown in FIG. 2A, sub-sequence 210A corresponds to the first half of sequences 115A, 115B, and 115C, and sub-sequence 210B corresponds to the latter (or second) half of those sequences. While sub-sequences 210A and 210B are depicted as corresponding to halves of sequences 115, in various cases, sub-sequences 210A and 210B may encompass different segments of data values. As an example, sub-sequence 210A may correspond to the first two data values of each sequence while sub-sequence 210B corresponds to the rest of the data values.

As shown within FIG. 2B, two sequences 115A and 115B are amplified to produce two additional sequences 127A and 127B. Additional sequences 127 may be produced in a number of different ways. In some cases, data amplifier 120 may select two sequences 115 from initial training data 110 and then copy those two sequences to create two copies. Data amplifier 120 may then swap data values between the two copies that fall within a selected sub-sequence (e.g., sub-sequence 210B), producing two additional sequences 127. In other cases, data amplifier 120 may select two sequences 115 and concatenate data values in a first sub-sequence (e.g., sub-sequence 210A) of one of the two sequences with data values in a second sub-sequence (e.g., sub-sequence 210B) of the other sequence to create one additional sequence and then concatenate data values in the second sub-sequence of the first sequence with data values in the first sub-sequence of the other sequence to create a second additional sequence. In various instances, data amplifier 120 may perform the two above exemplary ways using more than two sequences 115 and sub-sequences 210A and 210B. In the illustrated embodiment of FIG. 2B, the data values that fall within sub-sequence 210B have been swapped between sequences 115A and 115B to create additional sequences 127A and 127B.

As shown within FIG. 2C, a revised set of training data 220 includes initial training data 110 and additional sequences 127 produced from amplifying initial training data 110. In some cases, the number of additional sequences 127 is greater than the number of sequences 115 that is available in initial training data 110—e.g., revised set of training data 220 in FIG. 2C includes three sequences of initial training data 110 and four sequences of additional sequences 127. In some embodiments, the produced set of additional sequences 127 may not include all possible combinations. For example, as shown within FIG. 2C, additional sequences 127 do not include a sequence 127 having data values for sub-sequence 210A of sequence 115A and data values for sub-sequence 210B of sequence 115C. In various embodiments, data amplifier 120 may remove (or discard) those additional sequences 127 that do not match the trend of sequences 115 in initial training data 110. An example of removing additional sequences 127 will now be discussed below.

Figure 3A:
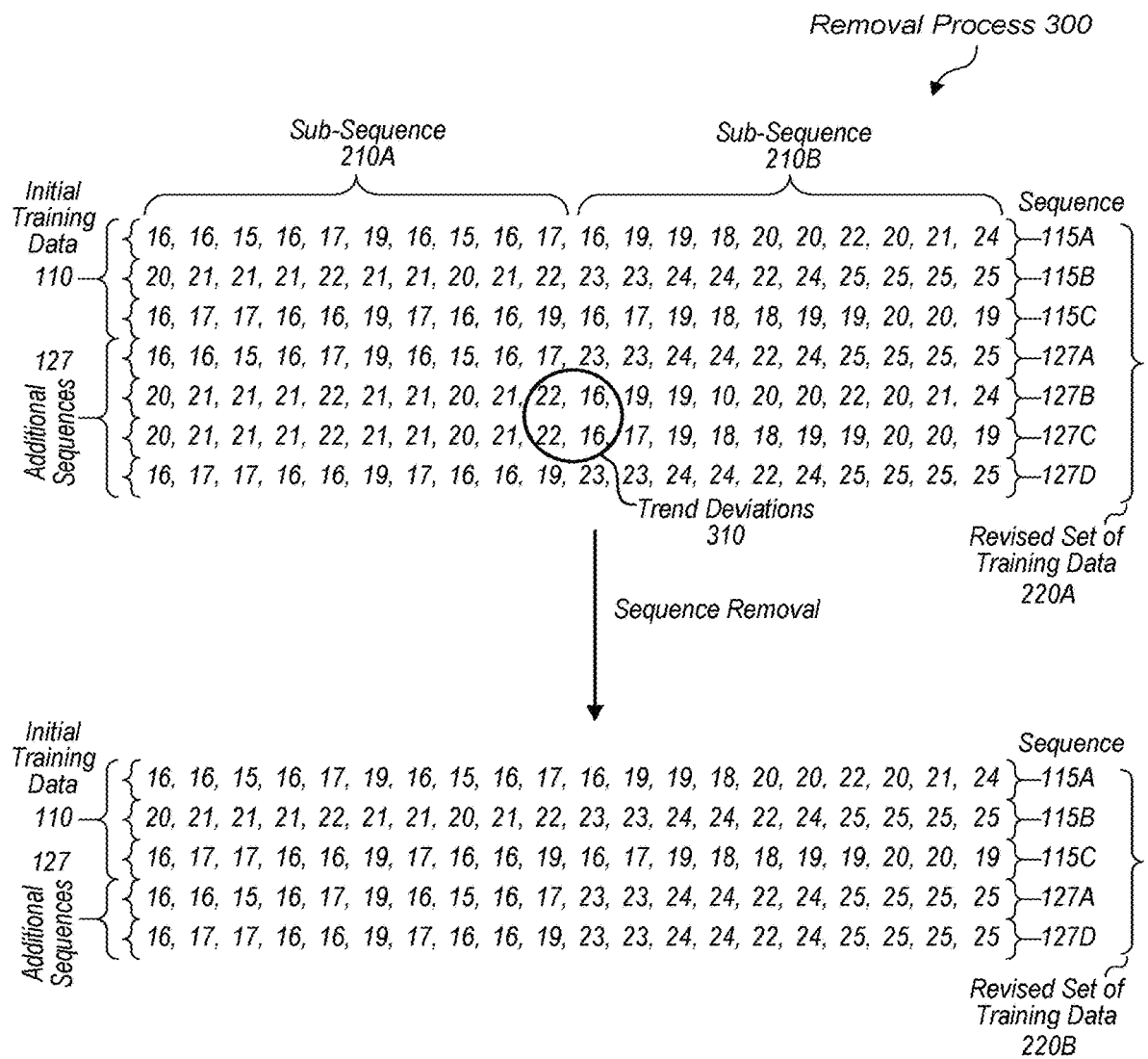
FIG. 3A is a block diagram illustrating example elements of a removal process for removing sequences from the additional sequences, according to some embodiments.

Turning now to FIG. 3A, a block diagram of an example removal process 300 to remove one or more additional sequences 127 is shown. In the illustrated embodiment, a revised set of training data 220A includes a total of seven sequences: three sequences 115 in initial training data 110 and four additional sequences 127. In various embodiments, the revised set of training data 220 may include different amounts of sequences and different sequences.

As mentioned earlier, sequences 115 in initial training data 110 may be associated with or identify a trend. For example and for illustrative purposes, sequences 115 shown in FIG. 3A correspond to a generally ascending trend of respiration rate per minute. In some cases, when creating a revised set of training data 220 from initial training data 110, one or more additional sequences 127 may be created that do not match or identify the trend of the sequences 115 in initial training data 110—such sequences 127 may include trend deviations 310. For example, in the illustrated embodiment, sequences 127B and 127C both include a drop from a data value of "22" to a data value of "16", which, in various instances, is not characteristic of a generally ascending trend of respiration rate per minute. Accordingly, in various embodiments, amplifier 120 determines additional sequences 127 that include trend deviations 310 and removes them to create an updated revised set of training data 220B.

To identify trend deviations 310, in some embodiments, data amplifier 120 determines whether the difference between data values at the edges of a crossover point between two sub-sequences 115 are consistent with other value transitions found in the initial sequences 115. These areas, in various cases, are more susceptible to trend deviations 310 then the inner data values of sub-sequences 210. Accordingly, data amplifier 120 may determine an acceptable threshold value difference between two data values without using domain-specific knowledge such as, e.g., the common respirations rates of people. In order to do so, data amplifier 120 may determine the largest difference between two adjacent data values in the initial sequences 115 or between the data value at the edge of a sub-sequence 210 and all subsequent data values. For example, data amplifier 120 may determine a threshold value of "3" as that may be the largest difference found between adjacent data values in sequences 115 (e.g., the difference between "19" and "16" in sequence 115A). When data values within sub-sequence 210A of sequence 115B are concatenated with data values within sub-sequence 210B of either sequence 115A or 115C to create additional sequences 127 as shown in the illustrated embodiment, such additional sequences 127 may be probable candidates for trend deviations 310 as the difference between the data values of the relevant edges may have a reasonable chance of satisfying the threshold value. As such, in various embodiments, data amplifier 120 determines whether the difference between the data values within an additional sequence 127 is greater than a threshold value, indicating whether that sequence 127 should be removed from the revised set of training data 220. For example, additional sequences 127B and 127C may be removed since the difference between "22" and "16" is greater than 3.

In some embodiments, before an additional sequence 127 is generated that has a trend deviation 310, data amplifier 120 may determine that that additional sequence 127 will have a trend deviation 310 and thus may not generate that additional sequence 127. In some instances, data amplifier 120 may make that determination based on the data values occurring around the edges of sub-sequences 210. In some embodiments, data amplifier 120 may select only sequences 115 that have similar data values around the relevant edge of sub-sequences 210 when producing additional sequences 127. For example, data amplifier 120 may not select sequences 115A and 115B as a combination for producing additional sequences 127 since the data value of sequence 115B at the right edge of sub-sequence 210A is "22" and the data value of sequence 115A at the left edge of sub-sequence 210B is "16", causing a resulting additional sequence 127 (e.g., sequence 127B) to have a trend deviation as there is a drop from "22" to "16". Note that the point at which data values of one sequence 115 transition to data values of another sequence 115 can be referred to as the crossover or transition point of an additional sequence 127. Another example of reducing the number of additional sequences 127 that do not match the trend of sequences 115 will now be discussed below.

Figure 3B:
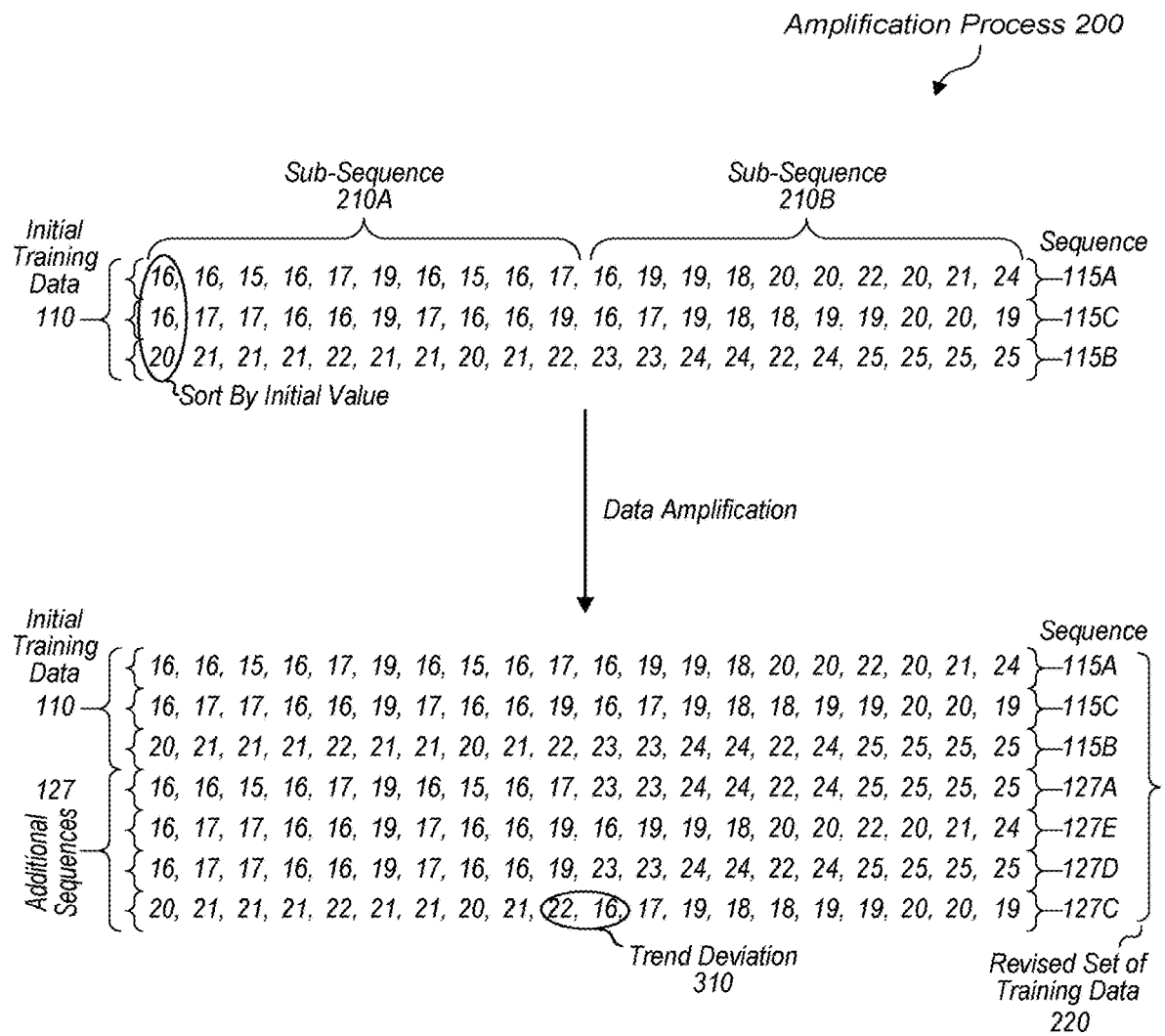
FIG. 3B is a block diagram illustrating example elements of an amplification process that involves sorting the initial training data, according to some embodiments.
Figure 4:
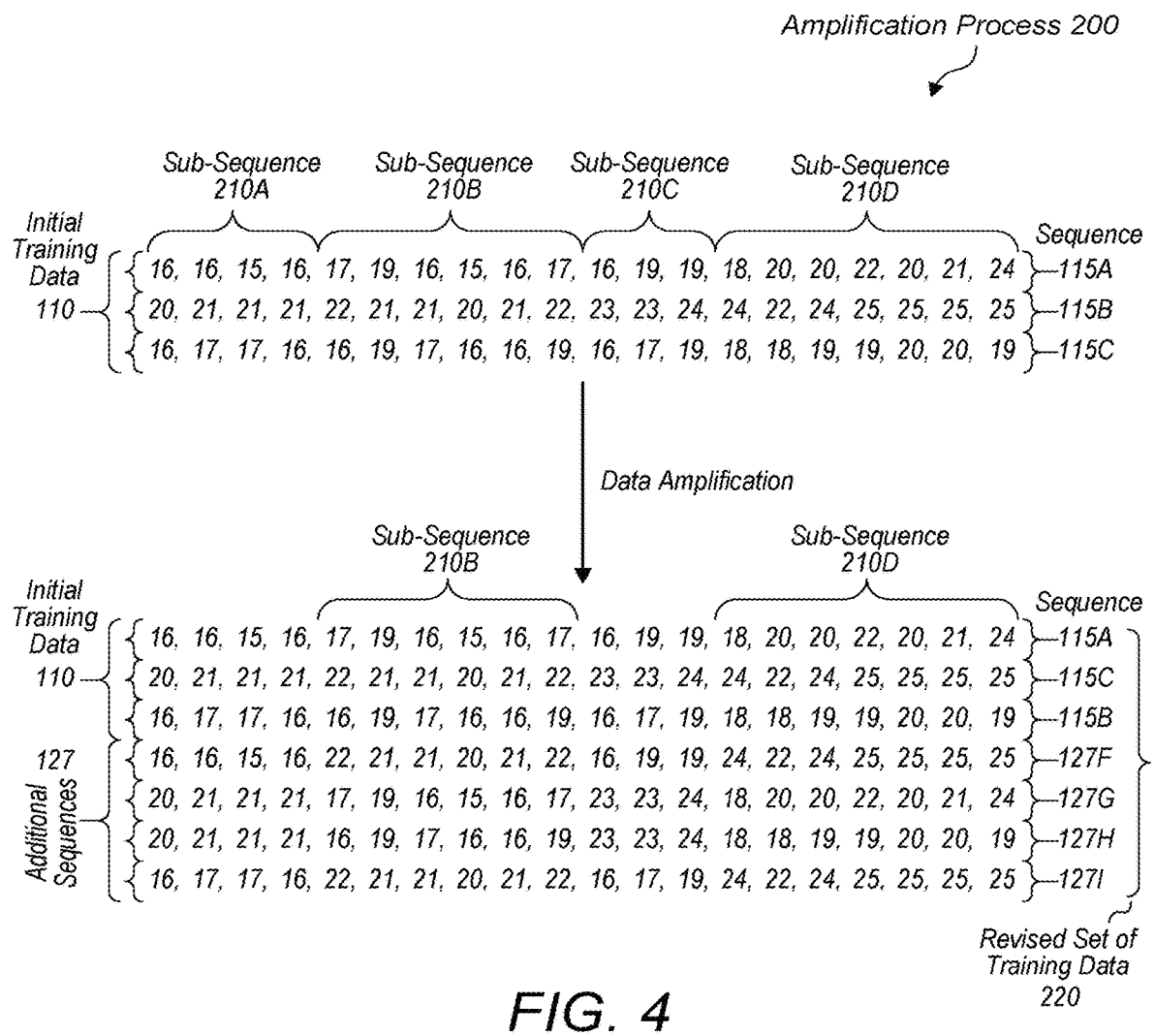
FIG. 4 is a block diagram illustrating example elements of an amplification process that involves determining multiple sub-sequences, according to some embodiments.

Turning now to FIG. 3B, a block diagram of an example amplification process 200 that involves sorting initial training data 110 is shown. In the illustrated embodiment, initial training data 110 includes sequences 115A, 115B, and 115C, and additional sequences 127 of revised set of training data 220 includes additional sequences 127A, 127C, 127D, and 127E. Initial training data 110 may, in some embodiments, include different amounts of sequences 115 and different sequences 115.

As mentioned earlier, in some cases, a revised set of training data 220 may not include all possible combinations of sequences 115. This being because, in various embodiments, data amplifier 120 may generate additional sequences 127 by concatenating data values from an $n^{th}$ sequence 115 with data values from an ($n^{th}$+1) sequence 115 in initial training data 110. For example, using the arrangement of sequences 115 as shown in FIG. 3B, data amplifier 120 may concatenate data values from sequence 115A ($n^{th}$) with data values from sequence 115C ($n^{th}$+1) and also concatenate data values from sequence 115C ($n^{th}$) with data values from sequence 115B ($n^{th}$+1), but not concatenate data values from sequence 115B ($n^{th}$) with data values from sequence 115A ($n^{th}$−2). Accordingly, in some cases, the arrangement of sequences 115 within initial training data 110 may affect the number of trend deviations 310 that appear in the revised set of training data 220. As an example, the arrangement of initial training data 110 in FIG. 2A when used to generate additional sequences 127 in the above manner may result in two trend deviations 310 as shown in FIG. 2C (and further highlighted in FIG. 3A) while the arrangement of initial training data 110 in FIG. 3B results in one trend deviation 310.

To reduce the number of trend deviations 310, in various embodiments, data amplifier 120 sorts initial training data 110 prior to generating additional sequences 127. In some cases, data amplifier 120 may sort sequences 115 relative to each other based on the initial data value of each sequence. Accordingly, as shown, sequences 115A and 115C appear before sequence 115B as they have a smaller initial value (i.e., "16"). In various cases, data amplifier 120 may sort sequences 115 relative to each other based on the data values occurring near the edges of sub-sequences 210—i.e., sort sequences 115 based on the data value found at the crossover/transition point between data values of concatenated sequences 115. For example, as depicted, sequence 115A appears before sequence 115C as sequence 115A's data value at the crossover point (or edge of sub-sequence 210A in this example) is "17", which is less than sequence 115C's data value of "19". Likewise, sequence 115C appears before sequence 115B because sequence 115C's data value at the crossover point is less than that of sequence 115B. Alternatively for this example, sequences 115 may be sorted based on the data values appearing at the left edge of sub-sequence 210B of those sequences.

Figure 5:
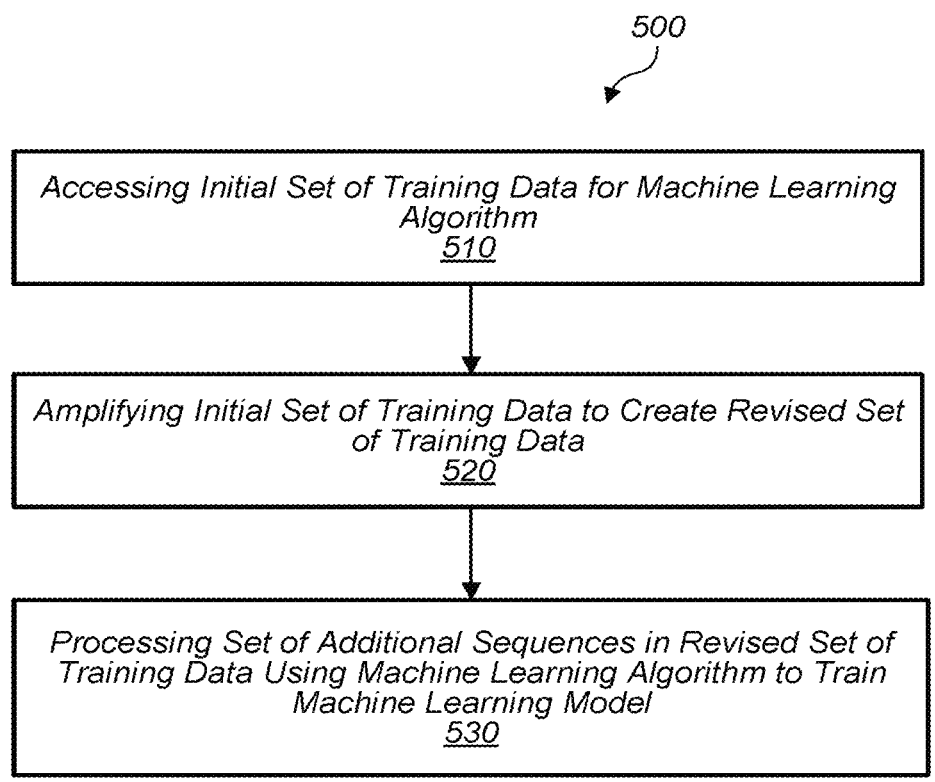
FIGS. 5-7 are flow diagrams illustrating example methods relating to amplifying initial data training data to produce additional sequences, according to some embodiments.

Turning now to FIG. 5, a block diagram of an example amplification process 200 that involves determining more than two sub-sequences 210 is shown. In the illustrated embodiment, initial training data 110 includes sequences 115A, 115B, and 115C. While sequences 115 are shown as being logically divided into four sections, sequences 115 may be logically divided into any number of sections. As shown, additional sequences 127 of the revised set of training data 220 include additional sequence 127F, 127G, 127H, and 127I.

In various embodiments, data amplifier 120 may determine multiple sub-sequences 210 for use in amplifying initial training data 110. For example, as shown, sub-sequences 210A, 210B, 210C, and 210D are chosen that logically divide sequences 115 into four distinct sections. Data amplifier 120, however, may determine sub-sequences 210 in a number of ways. In various cases, data amplifier 120 may randomly determine sub-sequences 210. In some cases, data amplifier 120 may determine sub-sequences 210 such that sequences 115 are divided into sections having equal lengths. In yet other cases, data amplifier 120 may look for points in sequences 115 where the data values are relatively similar across those sequences and thus define those points as the edges of sub-sequences 210. For example, while not shown, data amplifier 120 may determine that position "6" of sequences 115 (which corresponds to values "19", "21", and "19" for sequences 115A, 115B, and 115C, respectively) includes data values that are relatively similar and thus define the right edge of sub-sequence 210A as that position.

In various embodiments, when determining how to divide the initial sequences 115 into two or more sub-sequences 210, data amplifier 120 may search for crossover points where the same transition values are determined to exist elsewhere in the initial sequences 115, so as to reduce or eliminate the attenuation caused by crossover points that may not contain possible realistic value transitions. As an example, a transition from a value of "17" to a value of "19" may occur in a sequence 115 and thus data amplifier 120 may divide sequences 115 into two or more sub-sequences 210 in such a manner that similar or the same transition value of "2" (or even "17" to "19") occurs at the crossover point between sub-sequences 210 concatenated from the different sequences 115.

When creating an additional sequence 127, in various embodiments, data amplifier 120 may concatenate data values from more than two sequences 115. As an example, if sequences 115 are logically divided into three sub-sequences 210 (not shown), then data amplifier 120 may create an additional sequence 127 by concatenating data values that are within a first one of the sub-sequences 210 for sequence 115A, data values that are within a second one for the sub-sequences 210 of sequence 115B, and data values that are within the last one of the sub-sequences 210 for sequence 115C. That is, data values may be pulled from more than two sequences 115.

Turning now to FIG. 5, a flow diagram of a method 500 is shown. Method 500 is one embodiment of a method performed by a computer system (e.g., computer system 100) in order to generate a revised set of training data (e.g., revised set of training data 220). Method 500 may be performed as part of a process for preparing training data that can be fed into a machine learning algorithm (e.g., an algorithm implemented by machine learning engine 130) for training a model (e.g., model 135). In some embodiments, method 500 may include additional steps—e.g., sorting the initial set of training data based on, for example, the initial value within each of the sequences in that initial set.

Method 500 begins in step 510 with the computer system accessing an initial set of training data (e.g., initial training data 110) for a machine learning algorithm. The initial set of training data may specify a plurality of sequences (e.g., sequences 115), each of which defines a set of data values.

In step 520, the computer system amplifies the initial set of training data to create a revised set of training data. The amplifying may include identifying sub-sequences (e.g., sub-sequences 210) of data values in ones of the plurality of sequences in the initial set of training data. The sub-sequences that are identified may include a first sub-sequence corresponding to an initial half of at least different two sequences in the initial set of training data and a second sub-sequence corresponding to a latter half of the at least two different sequences.

The amplifying may also include using an inheritance algorithm (e.g., algorithm 125) to create a set of additional sequences of data values. In some embodiments, according to the inheritance algorithm, each one of the set of additional sequences of data values includes sub-sequences of data values from at least two different sequences in the initial set of training data. In some cases, creating one of the set of additional sequences may include concatenating the first sub-sequence of one of the at least two different sequences with the second sub-sequence of another one of the at least two different sequences. In other cases, creating a particular one of the set of additional sequences may include selecting two sequences from the plurality of sequences, generating a copy of each of the two selected sequences, and swapping data values between the generated copies that are within one of the first sub-sequence and the second sub-sequence.

In step 530, the computer system then processes the set of additional sequences in the revised set of training data using the machine learning algorithm to train a machine learning model. In various embodiments, the computer system removes (or discards) one or more of the set of additional sequences based on the one or more additional sequences not satisfying a particular threshold. In some cases, not satisfying the particular threshold may include the one or more additional sequences each having a set of data values identifying a trend different than a trend identified by the set of data values in each of the plurality of sequences in the initial set of training data. For example, the initial set of training data may identify a generally ascending trend of respiration rate per minute and thus sequences that do not correspond to such a trend may be removed.

Figure 6:
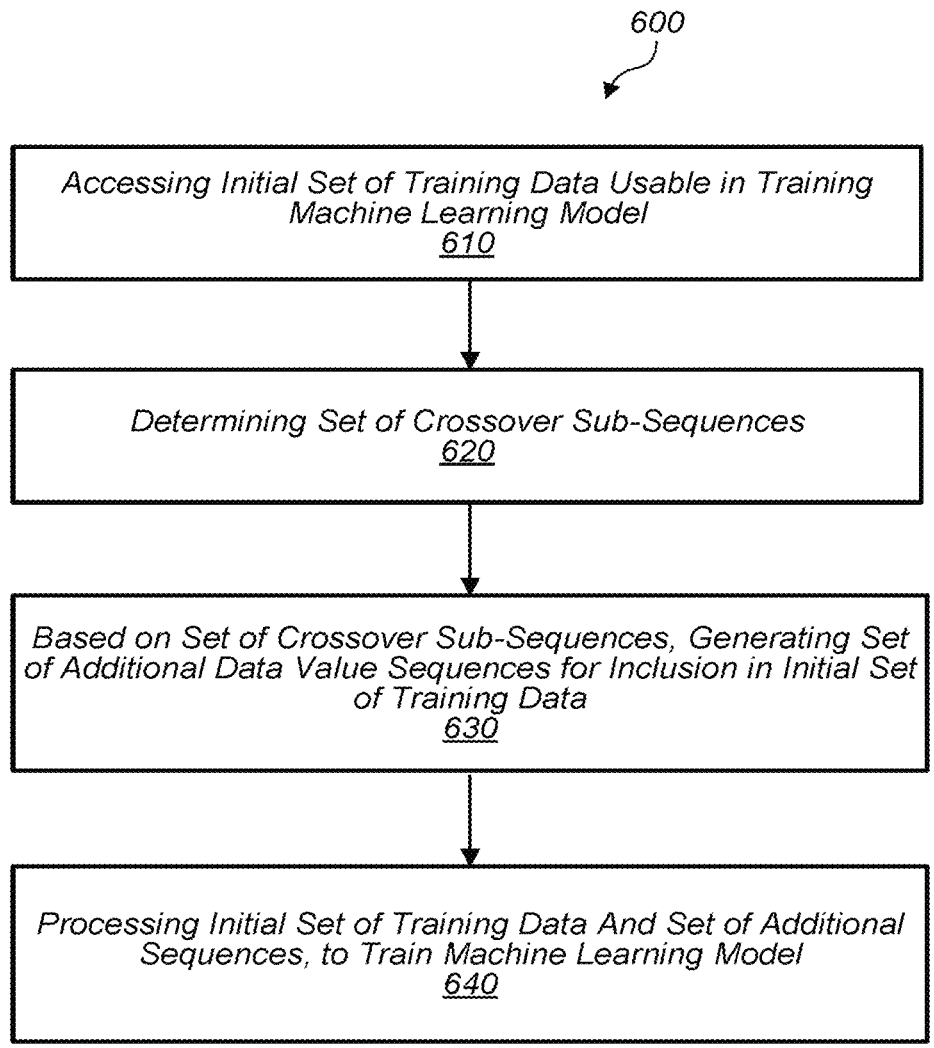

Turning now to FIG. 6, a flow diagram of a method 600 is shown. Method 600 is one embodiment of a method performed by a computer system (e.g., computer system 100) in order to generate additional data value sequences (e.g., additional sequences 127) based on an initial set of training data (e.g., initial training data 110). Method 600 may be performed by executing a set of program instructions stored on a non-transitory computer-readable medium. In some embodiments, method 600 may include additional steps—e.g., the computer system may sort the plurality of data value sequences (e.g., sequences 115) in the initial set of training data with respect to each other (i.e., the sequences are sorted relative to each other, not sorting the internal values of the sequences) based on a first occurring data value in each one of the plurality of data value sequences.

Method 600 begins in step 610 with the computer system accessing an initial set of training data usable in training a machine learning model (e.g., model 135). In various cases, the initial set of training data defines a plurality of data value sequences.

In step 620, the computer system determines a set of crossover sub-sequences (e.g., sub-sequences 210B and 210D). In some embodiments, a given crossover sub-sequence defines a sub-sequence that is usable for selecting data values of a data value sequence that are within the sub-sequence to replace data values of another data value sequence that are within the sub-sequence. In some instances, determining the set of crossover sub-sequences may include identifying, for each of the plurality of data values sequences, a midpoint that divides that data value sequence into two halves. At least one of the two halves may be a crossover sub-sequence. In other instances, determining the set of crossover sub-sequences may include determining, for at least two data value sequences based on one or more random points, a division of the at least two data value sequences into a plurality of sections, one of which may be a crossover sub-sequence.

In step 630, the computer system generates a set of additional data value sequences for inclusion in the initial set of training data. Generating a given one of the set of additional data value sequences may include selecting a first data value sequence from the plurality of data value sequences and replacing, for at least one of the set of crossover sub-sequences, data values of the first data value sequence that are within the at least one crossover sub-sequence with data values of a second data value sequences of the plurality of data value sequences that are within the at least one crossover sub-sequence. In some embodiments, the computer system prevents a particular one of the plurality of data value sequences from being used as the second data value sequence based on a difference between one or more of the data values of the first data value sequence and one or more data values of the particular data value sequence being greater than a threshold difference. In some embodiments, prior to selecting the first data value sequence, the computer system sorts the plurality of data value sequences with respect to each other based on a data value occurring at a particular position, which corresponds to the above midpoint, in each one of the plurality of data value sequences.

In step 640, the computer system processes the initial set of training data, and the set of additional sequences, to train the machine learning model.

Figure 7:
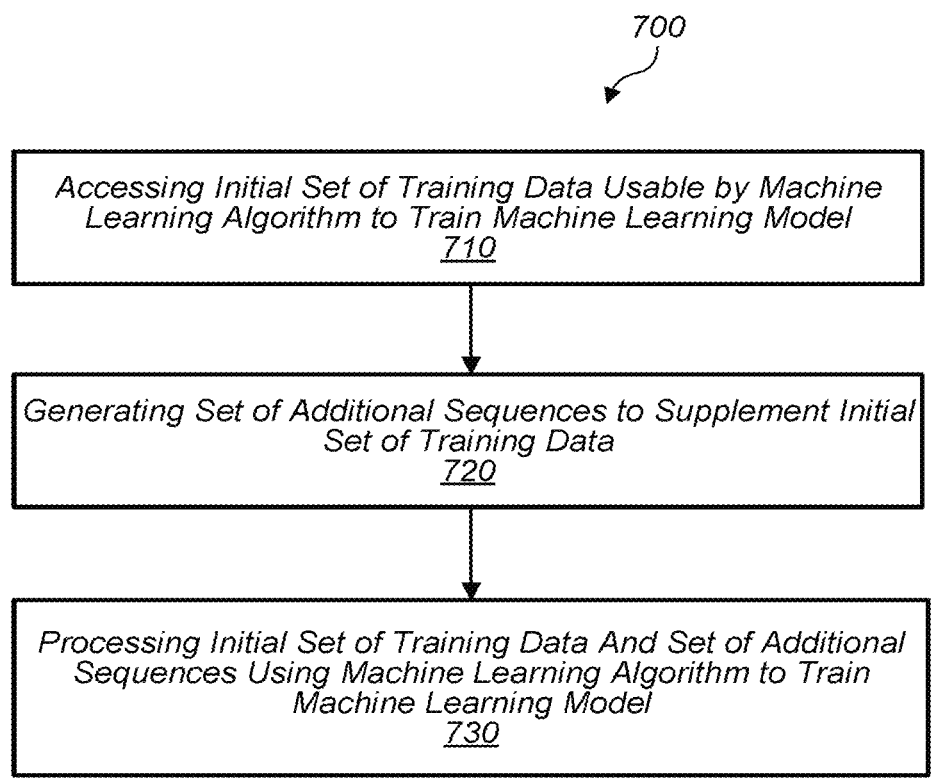

Turning now to FIG. 7, a flow diagram of a method 700 is shown. Method 700 is one embodiment of a method performed by a computer system (e.g., computer system 100) in order to generate additional sequences (e.g., sequences 127) based on an initial set of training data (e.g., initial training data 110). Method 700 may include additional steps—e.g., the computer system may label the additional sequences with a label associated with the initial set of training data, where the label is usable by a machine learning algorithm to classify the set of additional sequences.

Method 700 begins in step 710 with the computer system accessing an initial set of training data usable by a machine learning algorithm (e.g., an algorithm implemented by engine 130) to train a machine learning model (e.g., model 135). The initial set of training data may specify a set of sequences, each of which may define a plurality of values in an order identifying the same particular trend (e.g., a generally ascending respiration rate per minute). The plurality of values, for a given one of the set of sequences, may be ordered according to a time at which the plurality of data values were measured by another computer system.

In step 720, the computer system generates a set of additional sequences to supplement the initial set of training data. In some cases, generating the set of additional sequences may include generating at least one additional sequence by concatenating values of a first one of the set of sequences specified in the initial set of training data that are within a first sub-sequence with values of a second one of the set of sequences that are within a second sub-sequence. In some cases, the first and second sequences may have the same number of values.

In some cases, the at least one additional sequence may include values from a first half of the first sequence and values from a second, different half of the second sequence. In some embodiments, generating the set of additional sequences is performed, in method 700, only once for the initial set of training data. In some cases, the set of additional sequences includes more sequences than the initial set of training data.

Figure 8:
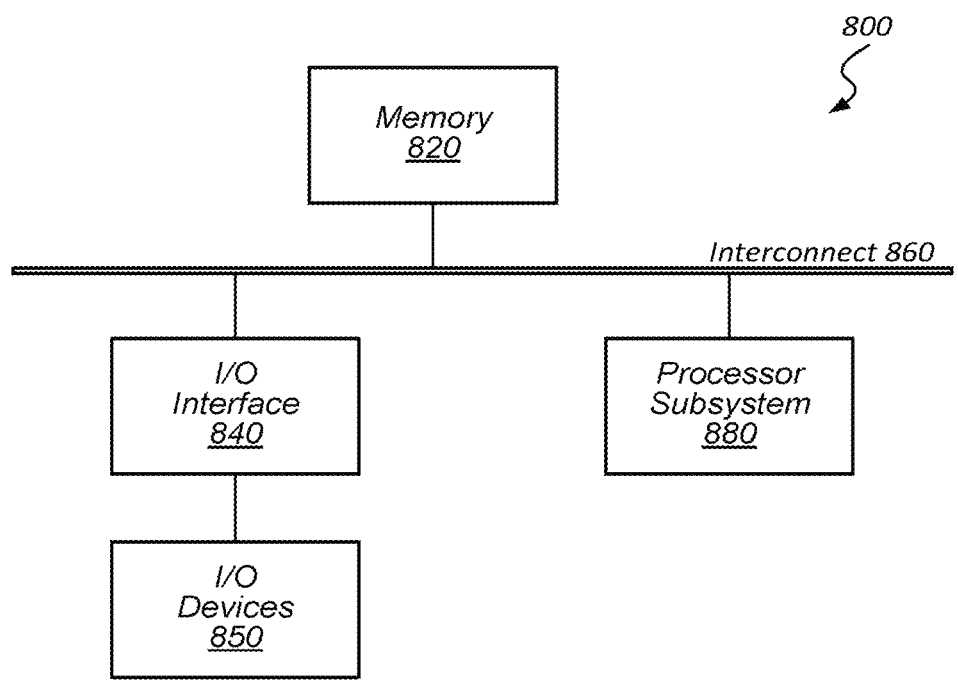
FIG. 8 is a block diagram illustrating an example computer system, according to some embodiments.

In step 730, the computer system processes the initial set of training data and the set of additional sequences using the machine learning algorithm to train the machine learning model. In some embodiments, the computer system determines one or more sequences in the set of additional sequences that define a plurality of values in an order identifying a trend different than the particular trend identified by the initial set of training data. Accordingly, the computer system may remove the one or more sequences from the set of additional sequences Exemplary Computer System Turning now to FIG. 8, a block diagram of an exemplary computer system 800, which may implement computer system 100 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement data amplifier 120 and machine learning engine 130 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
accessing, by a computer system, an initial set of training data usable by a machine learning algorithm to train a machine learning model, wherein the initial set of training data comprises a set of sequences, wherein each sequence of the set of sequences defines a plurality of values in an order identifying a particular trend;
generating, by the computer system, one or more additional sequences to supplement the initial set of training data, wherein generating the one or more additional sequences includes generating at least one additional sequence of the one or more additional sequences by:
concatenating values of a first sequence of the set of sequences specified in the initial set of training data that are within a first sub-sequence with values of a second sequence of the set of sequences that are within a second sub-sequence; and
processing, by the computer system, the initial set of training data and the one or more additional sequences using the machine learning algorithm to train the machine learning model.

2. The method of claim 1, wherein the one or more additional sequences defines a plurality of additional values in the order identifying the particular trend.

3. The method of claim 1, wherein the first and second sequences have the same number of values, and wherein the at least one additional sequence includes values from a first half of the first sequence and values from a second, different half of the second sequence.

4. The method of claim 1, further comprising:
determining, by the computer system, one or more generated sequences in the one or more additional sequences that identify a different trend than the particular trend; and
removing, by the computer system, the one or more generated sequences that identify the different trend from the one or more additional sequences.

5. The method of claim 4, wherein determining the one or more generated sequences that identify the different trend than the particular trend comprises:

determining that the one or more generated sequences deviate from the set of sequences of the initial set of training data.

6. The method of claim 4, wherein determining the one or more generated sequences that identify the different trend different than the particular trend comprises:

determining, by the computer system, the one or more generated sequences in the one or more additional sequences that deviate from the particular trend by a threshold amount.

7. The method of claim 4, wherein determining the one or more generated sequences that identify the different trend different than the particular trend comprises:

determining, by the computer system, a first cross-over value of the first sub-sequence and a second cross-over value the second sub-sequence; and determining, by the computer system, whether the first cross-over value and the second cross-over value deviate by a threshold amount.

8. The method of claim 4, wherein removing the one or more generated sequences from the one or more additional sequences comprises preventing the one or more generated sequences from being generated.

9. The method of claim 1, wherein generating the one or more additional sequences is performed, in the method, only once for the initial set of training data.

10. The method of claim 1, wherein the one or more additional sequences includes more sequences than the initial set of training data.

11. The method of claim 1, further comprising:

labeling the one or more additional sequences with a label associated with the initial set of training data; wherein the label is usable by the machine learning algorithm to classify the one or more additional sequences.

12. The method of claim 1, wherein the first sub-sequence has a different length than the second sub-sequence.

13. The method of claim 1, further comprising:

prior to generating the one or more additional sequences to supplement the initial set of training data, sorting the set of sequences with respect to each other based on a data value occurring at a particular position in each one of the set of sequences.

14. The method of claim 13, wherein the particular position comprises at least one of an initial value of each one of the set of sequences.

15. The method of claim 13, wherein the particular position comprises at least one of a cross-over value of each one of the set of sequences.

16. A non-transitory computer-readable medium having program instructions stored thereon that are executable by a computer system to perform operations comprising:

accessing an initial set of training data usable by a machine learning algorithm to train a machine learning model, wherein the initial set of training data comprises a set of sequences, wherein each sequence of the set of sequences defines a plurality of values in an order identifying a particular trend;

generating one or more additional sequences to supplement the initial set of training data, wherein generating the one or more additional sequences includes generating at least one additional sequence of the one or more additional sequences by:

concatenating values of a first sequence of the set of sequences specified in the initial set of training data that are within a first sub-sequence with values of a second sequence of the set of sequences that are within a second sub-sequence; and processing the initial set of training data and the one or more additional sequences using the machine learning algorithm to train the machine learning model.

17. The non-transitory computer-readable medium of claim 16, wherein the one or more additional sequences defines a plurality of additional values in the order identifying the particular trend.

18. The non-transitory computer-readable medium of claim 16, wherein the first and second sequences have the same number of values, and wherein the at least one additional sequence includes values from a first half of the first sequence and values from a second, different half of the second sequence.

19. The non-transitory computer-readable medium of claim 16, wherein the operations further comprise:

determining, by the computer system, one or more generated sequences in the one or more additional sequences that identify a different trend than the particular trend; and removing, by the computer system, the one or more generated sequences that identify the different trend from the one or more additional sequences.

20. The non-transitory computer-readable medium of claim 16, wherein the operations further comprise:

prior to generating one or more additional sequences to supplement the initial set of training data, sorting the set of sequences with respect to each other based on a data value occurring at a particular position in each one of the set of sequences.

* * * * *